United States Patent
Farr et al.

(10) Patent No.: US 6,279,260 B1
(45) Date of Patent: Aug. 28, 2001

(54) FISHING LURE FLASHER

(76) Inventors: Justin Farr, P.O. Box 1255, Challis, ID (US) 83226; Scott Burneski, RR #6 Site 650, C-82, Courtenay B.C. (CA), V9N 8H9

( * ) Notice: Subject to any disclaimer, the term of this patent is extended or adjusted under 35 U.S.C. 154(b) by 0 days.

(21) Appl. No.: 09/517,463

(22) Filed: Mar. 2, 2000

(51) Int. Cl.⁷ ............................ A01K 85/14; A01K 91/08
(52) U.S. Cl. .................... 43/43.12; 43/43.13; 43/42.5
(58) Field of Search ................... 43/43.12, 43.13, 43/42.5, 42.51; D22/129–131

(56) References Cited

U.S. PATENT DOCUMENTS

| | | | | |
|---|---|---|---|---|
| 3,568,351 | * | 3/1971 | Perrin | 43/42.5 |
| 3,656,253 | | 4/1972 | Gaunt | 43/42.33 |
| 3,659,370 | * | 5/1972 | Ritter | 43/43.12 |
| 3,765,118 | * | 10/1973 | Reitler | 43/43.12 |
| 3,778,918 | * | 12/1973 | Emory, Sr. et al. | 43/43.12 |
| 3,816,954 | * | 6/1974 | Bissonette | 43/43.12 |
| 3,874,110 | * | 4/1975 | Larson | 43/43.12 |
| 3,897,648 | * | 8/1975 | Neary | 43/43.13 |
| 4,012,863 | * | 3/1977 | Lori | 43/43.12 |
| 4,031,652 | * | 6/1977 | Johnson | 43/43.12 |
| 4,069,611 | * | 1/1978 | Dusich et al. | 43/43.12 |
| 4,122,624 | * | 10/1978 | Smith | 43/42.5 |
| 4,161,078 | * | 7/1979 | Pagani | 43/43.13 |
| 4,486,970 | * | 12/1984 | Larson | 43/43.13 |
| 4,628,630 | * | 12/1986 | Bohme | 43/43.12 |
| 4,691,466 | * | 9/1987 | Lamb | 43/43.13 |
| 5,020,267 | * | 6/1991 | Rasmussen | 43/43.13 |
| 5,020,268 | * | 6/1991 | Combs, III | 43/43.13 |
| 5,829,184 | * | 11/1998 | Studanski | 43/43.13 |
| 5,867,932 | * | 2/1999 | Reiger | 43/43.13 |
| 6,018,903 | * | 2/2000 | Miralles | 43/43.12 |

FOREIGN PATENT DOCUMENTS

| | | | | |
|---|---|---|---|---|
| 510092 | * | 2/1955 | (CA) | 43/42.5 |
| 629515 | * | 10/1961 | (CA) | 43/42.5 |
| 1242322 | * | 9/1988 | (CA) | 43/42.5 |
| 1010313 | * | 6/1957 | (DE) | 43/43.13 |
| 1563214 | * | 3/1969 | (FR) | 43/43.13 |
| 1179351 | * | 1/1970 | (GB) | 43/43.13 |
| 2299253 | * | 10/1996 | (GB) . | |

* cited by examiner

Primary Examiner—Darren W. Ark
(74) Attorney, Agent, or Firm—Jensen & Puntigam, PS

(57) ABSTRACT

A fishing flasher including a plurality of notches or holes at the trailing end, any one of which may serve as the temporary securement to the line. Removable plugs, secured to the line, are inserted into one of the notches or holes to be pulled free when a fish strikes allowing the flasher to move freely along the line.

2 Claims, 1 Drawing Sheet

FISHING LURE FLASHER

TECHNICAL FIELD

This invention relates to a fishing flasher, and more particularly to a fishing flasher, the action of which the user may readily alter, and which is automatically partially released from the line upon a strike by a fish, allowing the fisherman to directly play and feel the fish during capture.

BACKGROUND OF THE INVENTION

It is well known to use a flasher or dodger when fishing for salmon or other game fish. The flasher or dodger is used in conjunction with a lure and induces an erratic behavior to the lure, imparting the image that the lure is a sick bait fish. In addition, the flasher usually is reflective and serves to attract the game fish to the lure. The principal disadvantage to the standard dodger or flasher is that when playing the game fish, the dodger or flasher provides a resistance to movement in the water, thereby denying the fisherman the true feel of the fighting fish.

The flasher as traditionally used often offers interference during the netting of the fish, sometimes resulting in a lost fish.

Prior art known to the inventor includes U.S. Pat. No. 3,656,253, granted to Gaunt Apr. 18, 1972, which discloses an asymmetrical fishing flasher, and Canadian patent number 2,042,013, granted to Jamieson, which discloses a fishing flasher which is free to move along the line above a stopping member.

DISCLOSURE OF THE INVENTION

With the above-noted prior art in mind, it is an object of the present invention to provide a fishing flasher secured to the line with a means whereby the flasher is partially removed from the fishing line and is free to move therealong following the lure being stricken by a game fish.

It is another object of the present invention to provide a fishing flasher wherein the action of the flasher may be quickly and easily altered by varying the attachment to the line, and yet still enabled to be partially released upon having the lure being stricken by a game fish.

Yet another object of the present invention is to provide a unique releasable means for securing one end of a fishing flasher to the fishing line.

BEST MODE FOR CARRYING OUT THE INVENTION

Figure 1:
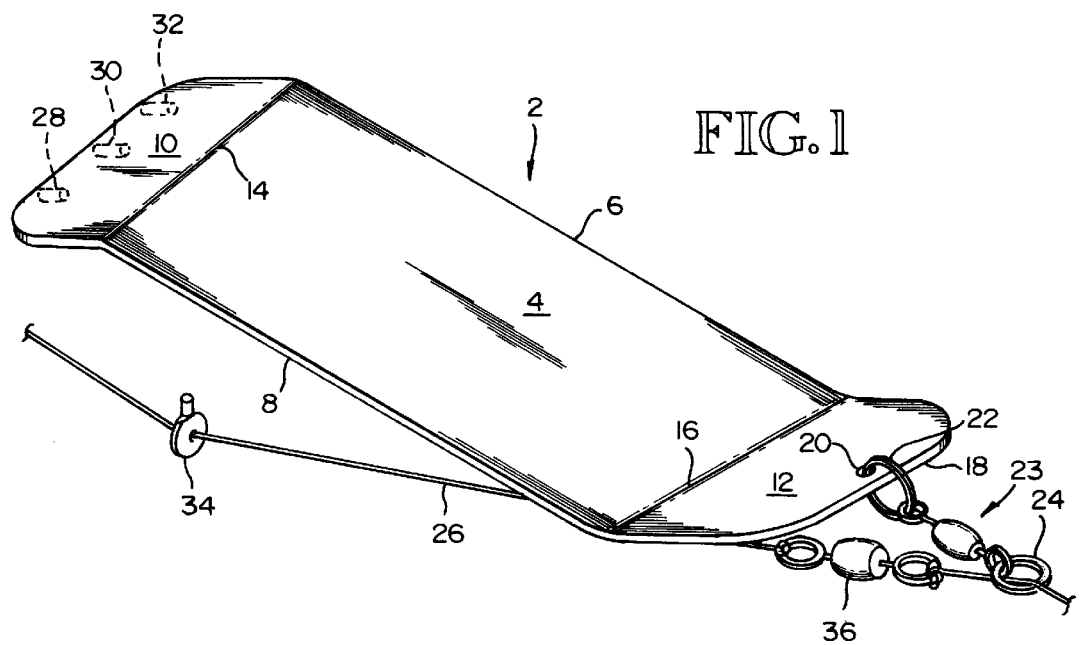
FIG. 1 is a perspective view of the present inventive dodger disclosing its securement to the fishing line.

As seen in FIG. 1, the inventive dodger comprises a main body portion 2, which has a generally flat central area 4, which may or may not be reflective, including sides 6 and 8 which need not be parallel. The end portions 10 and 12 are at an angle to the main central portion 4, and their bend lines 14, 16 are not necessarily parallel. The ends 10 and 12 are bent in opposite directions to generate the desired motion in the dodger as it is pulled through the water. The leading edge 18, i.e. that which is closest to the pole and the fish boat, includes a bore 20 through which is fed a ring 22, having secured thereto a swivel 23 which is secured to a second ring 24, through which the line 26 is fed. As to be explained hereinafter, it is critical to the present invention that the line 26 is free to pass through ring 24.

In the preferred embodiment there are a plurality of bores 28, 30, 32 in the trailing edge of the dodger 2 into which a plug 34 which is secured to line 26 may be wedged. The action of the dodger is affected by the position of securement to the line. A fish striking the downstream lure dislodges the plug 32 allowing the flasher to freely move on the line removing the drag and therefore allowing the fisherman to feel the fish. The bores could be replaced with a plurality of notches without altering the inventive concept.

A large swivel 36, see FIG. 1, is downstream of the position of attachment of the dodger and prevents the dodger from moving any further down the line to interfere with the bait, i.e., swivel 36 is too large to pass through ring or loop 24.

Upon a fish hitting the lure at the end of line 26 downstream from the flasher 2, the force pulls the plug 34 from its preselected notch, allowing the flasher 2 to freely move up and down the line, creating no resistance to the play of the fish by the fisherman. The line 26 likewise would include a stop swivel 48 to prevent the flasher from sliding down the line completely to the lure and interfering with the fish and the process of playing the fish during the capture.

Figure 2:
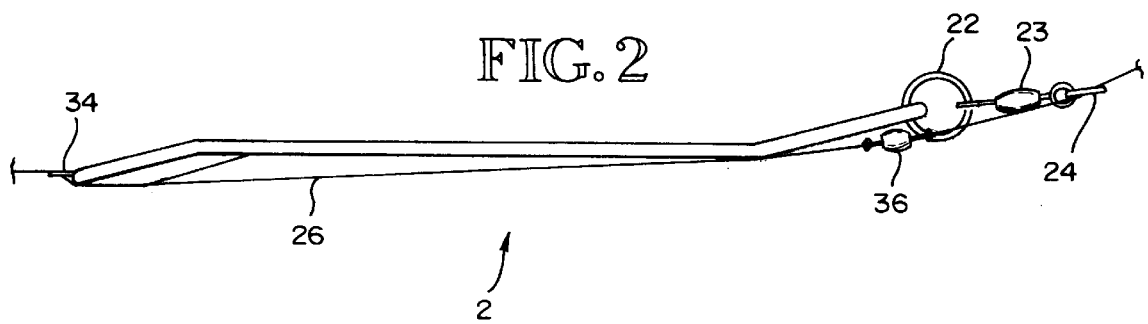
FIG. 2 is a side elevation view of the dodger of FIG. 1.

FIG. 2 further discloses the interrelationship of the parts of the present invention with plug 34 in operative position.

Figure 3:
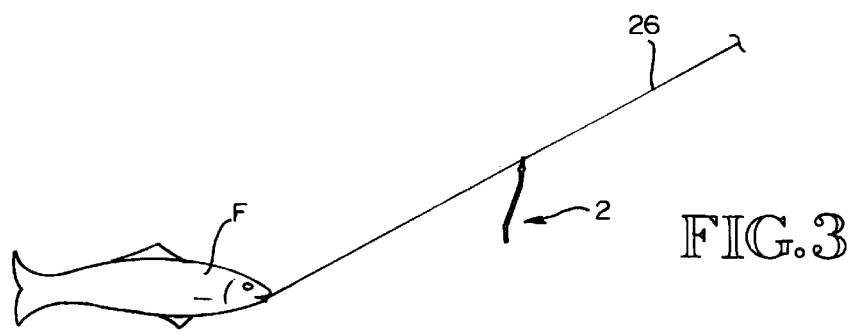
FIG. 3 is a pictorial representation of the inventive dodger following a strike by a sports fish.

As seen in FIG. 3, the flasher 2 is free to move on line 26, allowing the fish F to run without resistance and allows the fisherman to play the fish, with much less resistance.

Thus, as can be seen, the present invention of an improved flasher both allows the user to modify the action of the flasher in hopes of better attraction of the fish, and upon hooking a fish, the flasher becomes free to move on the line, greatly reducing the resistance.

What is claimed is:

1. A fishing flasher having a main body portion of relatively thin sheet material, including reflective surfaces, said main body portion extending in a plane along a longitudinal axis of said flasher, said flasher including leading and following end portions wherein said end portions extend at obtuse angles from the plane of said main body portion in opposite directions, and said following end portion having two or more openings therein;

means at the leading end for slideably securing the flasher to a fishing line intermediate a lure and a retrieving means;

easily releasable securement means at the following end for securing to securable to the following end in one of said two or more openings; and wherein when the flasher is used during fishing, said means for slideably securing the flasher is slidably engaged with the fishing line intermediate the lure and the retrieving means, said easily releasable securement means is frictionally secured to the following end in one of said two or more openings, and whereby a tug on the lure by a fish releases the securement means from said one of said two or more openings leaving the flasher free to move along the line.

2. A flasher as in claim 1, wherein the securement means comprises a plug, which includes an opening to receive the line and said two or more openings comprise bores.

* * * * *